United States Patent [19]

Turner et al.

[11] Patent Number: 4,528,348

[45] Date of Patent: Jul. 9, 1985

[54] MICELLAR PROCESS FOR THE PRODUCTION OF ACRYLAMIDE-ALKYL ACRYLAMIDE COPOLYMERS

[75] Inventors: S. Richard Turner, Rochester, N.Y.; Donald B. Siano, Fanwood; Jan Bock, Bridgewater, both of N.J.

[73] Assignee: Exxon Research & Engineering Company, Florham Park, N.J.

[21] Appl. No.: 527,108

[22] Filed: Aug. 29, 1983

Related U.S. Application Data

[63] Continuation-in-part of Ser. No. 454,289, Dec. 29, 1982, abandoned.

[51] Int. Cl.³ ............................ C08F 2/26; C08F 2/28; C08F 2/30
[52] U.S. Cl. .................................... 526/225; 526/72; 526/303.1
[58] Field of Search ............................................ 526/225

[56] References Cited

U.S. PATENT DOCUMENTS

| | | | |
|---|---|---|---|
| 2,790,789 | 4/1957 | Miller | 526/303.1 |
| 3,075,956 | 1/1963 | Shields | 526/303.1 |
| 4,098,987 | 7/1978 | Barua et al. | 526/304 |
| 4,151,333 | 4/1979 | Lenke | 526/307.2 |
| 4,154,910 | 5/1979 | Tanaka | 526/307.2 |

FOREIGN PATENT DOCUMENTS 1110422 7/1961 Fed. Rep. of Germany ... 526/307.2
1169064 4/1964 Fed. Rep. of Germany ... 526/307.2

OTHER PUBLICATIONS

J.A.C.S., vol. 103, No. 14, (1981), pp. 4280–4281, Thomas et al.

*Primary Examiner*—Joseph L. Schofer
*Assistant Examiner*—Peter F. Kulkosky
*Attorney, Agent, or Firm*—Richard E. Nanfeldt

[57] ABSTRACT

The copolymerization of water soluble monomers with water insoluble monomers can be effected by using a solution of a water soluble surfactant to solubilize the water insoluble monomer. The aqueous medium containing the surfactant and water insoluble monomer is therefore a homogeneous, isotropic, transparent dispersion, into which the water soluble monomer can be dissolved and, after addition of a suitable free radical initiator, can be copolymerized to give a reaction mixture which does not phase separate, or contain substantial amounts of particulates of insoluble monomer. The copolymers which may be isolated from the reaction mixture are good viscosifiers of water and brine.

7 Claims, 1 Drawing Figure

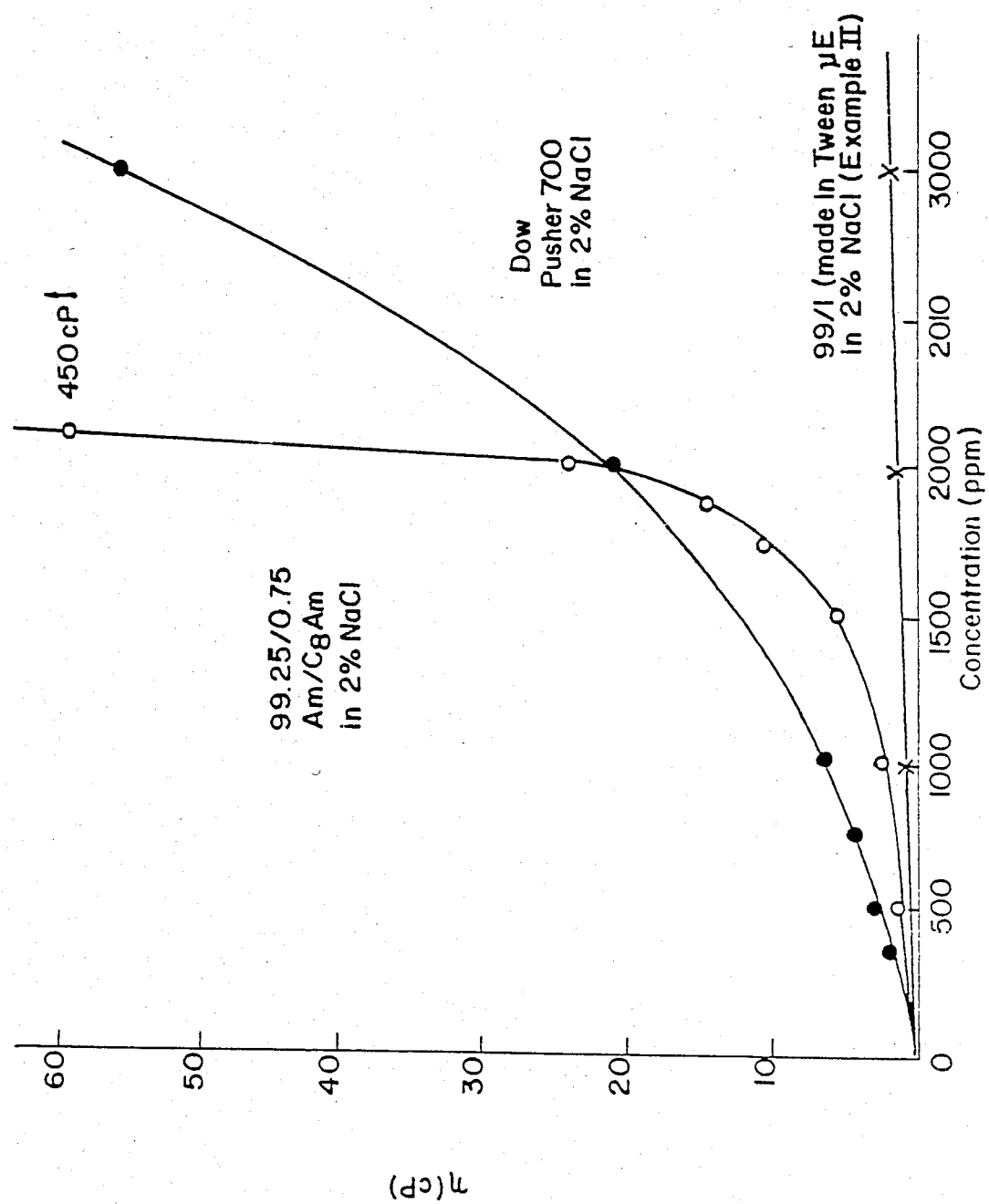

MICELLAR PROCESS FOR THE PRODUCTION OF ACRYLAMIDE-ALKYL ACRYLAMIDE COPOLYMERS

CROSS-REFERENCE TO RELATED APPLICATION

The instant application is a continuation-in-part application of U.S. Ser. No. 454,289, filed Dec. 29, 1982, and now abandoned.

BACKGROUND OF THE INVENTION

Polyacrylamide and hydrolyzed polyacrylamide are water soluble polymers that have been previously disclosed in the literature and have found application in the viscosification of aqueous solutions. This is achieved through a combination of high molecular weight and chain expansion due to repulsion of pendant ionic groups along the polymer chain. However, high molecular weight polymers present well known difficulties in manufacture and subsequent processing because of their irreversible degradation when exposed to conditions of high shear such as would be obtained in the usual stirring devices. Moreover, the presence of pendant ionic groups leads to solution properties which are markedly influenced by the presence of dissolved cations. In particular, the viscosity of solutions of these polymers usually decreases strongly upon increasing concentrations of brine.

We have discovered an alternative means for providing polymers which viscosify water or brine at low concentrations. This method relies on the incorporation of a small amount of hydrophobic groups into a polymer with a water soluble backbone. These hydrophobic groups tend to associate with one another in an aqueous solution, and when the association occurs intermolecularly, the solution viscosity may be increased relative to the polymer without the hydrophobic side groups. An additional benefit is that the solution viscosity is relatively insensitive to salts because the hydrophobic groups are not ionic.

The synthesis of copolymers composed of water soluble and water insoluble monomers presents difficulties. In order for polymerization to be effected, the monomers must obviously come into close proximity to one another. A variety of processes based upon prior art could conceivably achieve this, but have serious deficiencies, necessitating the instant invention. For example, simply dispersing the water insoluble monomer as fine particles in the aqueous medium, while dissolving the water soluble monomer in water would result in poor incorporation of the water insoluble monomer and would lead to a heterogeneous product of particles dispersed in the predominantly water soluble polymer. This would therefore require the extra step of separating the unreacted monomer particulates from the reaction product.

Conventional emulsion polymerization, which uses a surfactant to disperse the water insoluble monomer into the aqueous medium containing the dissolved water soluble monomer, has other disadvantages. In this process, the bulk of the water insoluble monomer is contained initially in droplets which are at least one micron in diameter. These droplets must be stabilized against coalescence by a combination of agitation and added surfactant. The product copolymer is usually in the form of particulates with diameters on the order of 500 to 2000 Å in diameter.

Alternatively, both monomers may be dissolved in a solvent or solvent mixture having properties intermediate between water and a hydrocarbon solvent. Although this undoubtedly allows the comonomers to come into close proximity to one another, since the dispersion is on a molecular scale, this process presents other difficulties. For example, often the copolymer is insoluble in the mixed solvent which is capable of solubilizing the monomers. This leads to precipitation of the copolymer when it has a molecular weight which is still too low to produce efficient viscosification. The reaction product is usually heterogeneous which therefore requires a disadvantageous additional processing step. Furthermore, the water miscible solvents such as alcohols, acetone, ethers and acetic acid are fairly good chain transfer agents and when used in reasonable quantities would lead to decreased molecular weights and hence poor viscosification efficiency.

SUMMARY OF THE INVENTION

A process for producing copolymers of water soluble monomers with water insoluble monomers has been discovered to yield efficient viscosifiers of aqueous media. The process relies on the complete solubilization of the water insoluble monomers by means of a dilute solution of a suitable water soluble surfactant. The surfactant chosen and its concentration is one that produces a clear, uniform, homogeneous mixture in the presence of the water soluble monomer, and which remains a clear uniform, homogeneous mixture with no phase separation as the reaction proceeds toward completion. The micelles formed by the surfactant which solubilize the water insoluble monomer are small aggregates, consisting of on the order of 50–200 molecules. They are stable toward phase separation and effectively disperse the water insoluble monomer on a very fine scale so that the copolymerization is effected without the formation of latexes or fine particulates of the water insoluble monomer.

The copolymers which may be isolated from the reaction mixture, form aqueous solutions which are very efficient viscosifiers of water or brine, having molecular weights such that their intrinsic viscosities are greater than about 1 dl/g, but not so high that they are extremely susceptible to shear degradation.

BRIEF DESCRIPTION OF THE DRAWING

The FIGURE illustrates a plot of viscosity versus concentration for an acrylamide/octyl acrylamide copolymer prepared by the homogeneous micellar polymerization process. It is compared to one prepared by a homogeneous microemulsion process and a commercially available partially hydrolyzed polyacrylamide, Dow Pusher TM 700.

DETAILED DESCRIPTION OF THE INVENTION

The process of this invention overcomes the difficulties experienced in conventional polymerizations just described. In particular, it enables the copolymerization of the water soluble monomer, acrylamide, and water insoluble monomers such as an alkylacrylamide to give copolymers which are efficient aqueous viscosifiers. The process relies on cosolubilizing the water insoluble monomer into a predominantly aqueous media by the use of a suitable water soluble surfactant, such as sodium dodecylsulfate. When mixed with an aqueous solution of the water soluble monomer, the surfactant solution can disperse the water insoluble monomer on an extremely fine scale so that the reaction mixture is isotropic, clear, and homogeneous. These micellar reaction mixtures are free of visible oil droplets or particulates of the water insoluble monomer. The polymerization can therefore be initiated by water soluble initiators to give copolymers that are substantially free of visible particulates. The resultant reaction product remains homogeneous throughout the course of the reaction.

Micelles formed by the surfactant which solubilize the water insoluble monomer are generally very small aggregates which consist of on the order of 50 to 200 molecules. They form spontaneously upon mixing the components together, i.e., they do not require the vigorous mixing conditions required in conventional emulsion polymerization in which macroemulsions are formed. The macroemulsion droplets of the conventional emulsion polymerization process have diameters which are at least 10,000 Å. They therefore tend to phase separate upon standing, leading to undesirable inhomogeneities in the produced copolymer. The homogeneous micellar reaction mixture is, on the other hand, much more stable against demixing than the formulations used in emulsion polymerization processes. Indeed, no stirring is required during the course of the micellar copolymerization—the micellar aggregates remain extremely finely dispersed throughout. Moreover, the extremely dispersed nature of the micellar aggregate permits the copolymermization to occur in such a way that a water soluble copolymer is produced which does not contain particulates or latexes of water insoluble polymers. These would be detrimental in such applications as secondary oil recovery, which requires a product which is substantially free of pore plugging particulates.

The surfactants which may be used in this process may be one of the water soluble surfactants such as salts of alkyl sulfates, sulfonates, carboxylates and the like, or nonionic such as ethylene oxide-propylene oxides copolymers, or polyoxyethylene alkyl ethers, etc., or cationic surfactants such as primary alkylamines, dialkyl secondary amines, or ethoxylated fatty amines. Suitable surfactants may be chosen from these on the basis of water solubility and solubilization capacity for the water insoluble monomer.

Suitable free radical initiators for the micellar copolymerization process are peroxides such as hydrogen peroxide, potassium persulfate, alkyl peroxides and the like. The concentration of the free radical initiator is about 0.01 to about 0.50 grams per hundred grams of acrylamide and alkylacrylamide monomer. The polymerization is conducted in the absence of oxygen at a temperature of about 20° to about 100° C. The polymer may be recovered from the micellar reaction mixture by precipitation by nonsolvents such as acetone.

The water soluble copolymers which are produced by the micellar copolymerization process of the instant invention are characterized by the formula:

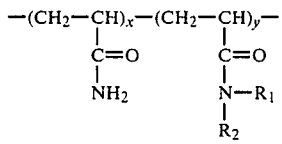

wherein $R_1$ is preferably a $C_6$ to $C_{22}$ straight chained or branched alkyl or cycloalkyl group, more preferably $C_6$ to $C_{20}$ and most preferably $C_6$ to $C_{18}$, and $R_2$ is the same or different alkyl group as $R_1$, or hydrogen. Typical, but non-limiting examples of preferred alkyl groups are hexyl, octyl, decyl, dodecyl and steryl groups. X is preferably about 90.0 to 99.9 mole %, more preferably about 95.0 to about 99.8 mole %, and most preferably about 97.0 to about 99.5 mole %. These water soluble copolymers are of a sufficiently high molecular weight that they are efficient viscosifiers of water or brine, but not so high that they are readily susceptible to irreversible shear degradation. That is, their intrinsic viscosity is greater than 1 dl/g and less than about 10 dl/g.

DESCRIPTION OF THE PREFERRED EMBODIMENT

The following examples explain the invention, which are by way of illustration, but not of limitation.

In the examples and comparative examples, the alkylacrylamides used were prepared as follows. A 500 ml 4 necked round bottom flask equipped with a condenser, thermometer, $N_2$ inlet, magnetic stir bar and dropping funnel. After purging with $N_2$, the n-octylamine, 14.35 g (0.11 mole) and triethylamine, 12.35 g (0.12 mole) were mixed with 50 ml of toluene and added to the flask. The acryloyl choride, 10.0 g (0.11 mole) was dissolved in 50 ml of toluene and added to the dropping funnel. The reaction is exothermic so the temperature was controlled via an ice bath and the acryloyl chloride was added dropwise so that the contents of the flask stayed below 40° C. The resulting slurry was stirred for an additional hour and then filtered to remove the triethylamine hydrochloride. The filtrate was stripped in a rotary evaporator to remove toluene. The resulting product was taken up into 240 ml of acetone and then cooled to $-70°$ C. in a dry ice bath. The monomer crystals were filtered on a coarse filter under $N_2$ and then vacuum dried at room temperature for one day. A yield of 14.3 g ($\approx 70\%$) of white crystals was obtained. A melting range of 36° to 37° C. was observed. The same procedure was used to prepare N-n-dodecylacrylamide except 20.36 g (0.11 mole) of n-dodecylamine was substituted for the n-octyl amine.

EXAMPLE 1

Micellar Copolymerization of 99.25/0.75 Mole % Acrylamide/Octyl Acrylamide

A one liter flask was equipped with an electric stirrer, reflux condenser, thermometer and inert gas inlet and outlet. The flask was flushed with nitrogen for one half hour. Then 15.85 g of sodium dodecyl sulfate (Polysciences), 14.76 g of acrylamide (twice recrystallized) and 0.288 g of octyl acrylamide and then 470.7 g of water that was deaerated with bubbling $N_2$ was added to the reaction flask. After a few minutes, a homogeneous, water-clear mixture resulted. It was then heated to 50° C. and 0.01 g of potassium persulfate initiator was added. After 24 hours of stirring at this temperature, the mixture became very viscous, but it remained homogeneous and transparent. It was then cooled to room temperature, removed from the reaction vessel and precipitated by the addition of acetone. The polymer was then vacuum dried at room temperature for four days. The result was 9.2 g of a pure white friable solid.

EXAMPLE 2

Micellar Copolymerizations With Varying Ratios of Acrylamide to Octyl Acrylamide Polymerization according to the procedures of Example 1 were used except that different amounts of octyl acrylamide were added to the reaction vessel. One vessel had no octyl acrylamide added, while the other two had sufficient amounts to yield 0.25 and 0.50 mole % of octyl acrylamide, based upon the acrylamide and octyl acrylamide. The isolation of the copolymer was also the same.

COMPARATIVE EXAMPLE 1

Acrylamide/Octyl Acrylamide//99/1 Mole Percent in Tween-60 Microemulsion

To carry out the polymerization, 25 g of the surfactant mixture comprising 15.85 g of Tween-60, 8.15 g of N-pentanol and 1.0 g of Hexadecane (ex water) was prepared and 0.5 g (one mole %) of octyl acrylamide was added. A clear homogeneous mixture resulted. This was placed in the reactor and then 460 ml of deaerated water was added under $N_2$ and 14.69 g of acrylamide was added. After mixing, the microemulsion reaction mixture was still water-clear, comparable in clarity to the Tween-60 microemulsion itself without added comonomers. The initiator, consisting of potassium persulfate (0.01 g) was added when the temperature reached 50° C. The temperature was maintained for 24 hours. The resulting mixture became slightly hazy and slightly foamy. The polymer was recovered by precipitation into acetone and it was redissolved into water.

SOLUTION PROPERTIES

The polymers (0.3 g) prepared as in Example 1 and Example 2 were dissolved into 100 ml of 2% NaCl solution overnight with rather vigorous agitation. These solutions were used as stocks to be diluted with 2% NaCl and viscosities at a shear rate of 1.28 s$^{-1}$ at 25° C. were measured by means of a Contraves ™ LS-30 viscometer.

The intrinsic viscosities of the polymers, $[\eta]$ and their Huggins' coefficient, $k_h$, were determined by measuring the viscosities, $\eta$, of five solutions of varying concentration such that the viscosities fell between 1.2 and 2.0 cP. A linear model was used to fit the data, according to the equation:

$$\frac{\eta - \eta_o}{\eta_o c} = [\eta] + k_h [\eta]^2 C \quad (1)$$

where C is the concentration of polymer in g/100 ml, and $\eta_o$ is the viscosity of the solvent. The term on the left hand side of Equation 1 is a measure of viscosification efficiency at low concentrations, so high values of $k_h$ and $[\eta]$ are desirable insofar as high viscosification efficiency is required. A comparison of these parameters as a function of the amount of octyl acrylamide used in the copolymerization may be made in Table I.

TABLE 1

| Intrinsic Viscosities and Huggins' Parameters for Am/C$_8$Am Copolymers | | |
|---|---|---|
| % C$_8$Am | $[\eta]$ | $k_h$ |
| 0.00 | 3.3 ± 0.3 dl/g | 0.68 ± 0.1 |
| 0.25 | 4.2 ± 0.3 | 2.4 ± 0.2 |
| 0.50 | 4.0 ± 0.2 | 1.5 ± 0.1 |
| 0.75 | 6.6 ± 1.2 | 2.1 ± 0.5 |

This table shows that a higher value of Huggins' constant results when the octyl acrylamide is included in the copolymerization. The homopolyacrylamide, polymerized under the same conditions not only as a low, expected value of the Huggins' constant, but also has a slightly lower intrinsic viscosity. Thus, improved viscosification efficiency results when the homogeneous micellar copolymerization process is used in combination with a water insoluble monomer.

A comparison of the viscosities over a wider range of concentration in two percent sodium chloride for the polymer of Example 1 and Comparative Example 1 is shown in FIG. 1. Also shown for reference is a commercially available polymer used for aqueous solution viscosification at low concentrations, Dow Pusher ™ 700, which is a partially hydrolyzed polyacrylamide. Above about 2000 ppm the copolymer of Example 1 is much higher than that of the commercially available material, even though the latter had a measured intrinsic viscosity about four times as high as the former. The high value of the Huggins' constant is responsible for the strong upsweep in viscosity at higher concentrations in the copolymer and shows that the micellar copolymerization process can result in good aqueous solution viscosifiers.

What is claimed is:

1. A homogeneous micellar free radical copolymerization process for the formation of a copolymer of acrylamide and an alkyl acrylamide corresponding to the formula below which comprises the steps of:
   (a) forming a mixture of sodium dodecyl sulfate or other suitable surfactant, acrylamide monomer and alkyl acrylamide monomer under a nitrogen atmosphere;
   (b) adding deoxygenated water to said mixture to form a homogeneous reaction solution;
   (c) adding a free radical initiator to said homogeneous reaction solution to initiate polymerization of said acrylamide monomer and said alkyl acrylamide monomer; and
   (d) copolymerizing said acrylamide monomer and said alkyl acrylamide monomer at a sufficient temperature and for a sufficient period of time to form said copolymer of acrylamide/alkyl acrylamide and without the formation of substantial amounts of particulates or phase separation occurring, said copolymer having an intrinsic viscosity of about 1 to about 10 dl/g, said copolymer having the formula:

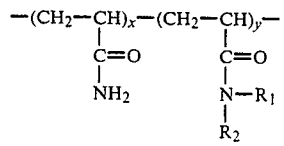

wherein $R_1$ is a $C_6$ to $C_{22}$ alkyl or cycloalkyl group, $R_2$ is the same or different alkyl group as $R_1$ or hydrogen, x is about 90.0 to about 99.9 mole %, and y is about 0.1 to about 10.0 mole %.

2. A process according to claim 1 wherein said copolymer is water soluble.

3. A process according to claim 1 or 2 further including recovering said copolymer from said reaction solution.

4. A process according to claim 1 or 2 wherein $R_1$ is selected from the group consisting of hexyl, octyl, decyl, dodecyl or hexadecyl groups, and $R_2$ is selected from the same group or hydrogen.

5. A process according to claim 1 or 2 wherein said free radical initiator is selected from the group consisting of potassium; sodium thiosulfate, potassium persulfate mixture; and benzoylperoxide or other common free radical initiators.

6. A process according to claim 1 or 2 wherein said polymerization is carried out at about 0 to about 70° C. for about 1 to about 48 hours.

7. A process according to claim 1 or 2 wherein a concentration of said acrylamide monomer and said alkylacrylamide monomer in said reaction solution is about 1.0 to about 50.0 grams of said acrylamide monomer and said alkyl acrylamide monomer per 100 grams of water.

* * * * *